Nov. 15, 1955  J. C. MOUZON  2,724,040
CONTROL APPARATUS
Filed Aug. 17, 1950  2 Sheets-Sheet 1

*INVENTOR.*
JAMES C. MOUZON
BY Arthur H. Swanson
ATTORNEY.

Nov. 15, 1955  J. C. MOUZON  2,724,040
CONTROL APPARATUS
Filed Aug. 17, 1950  2 Sheets-Sheet 2
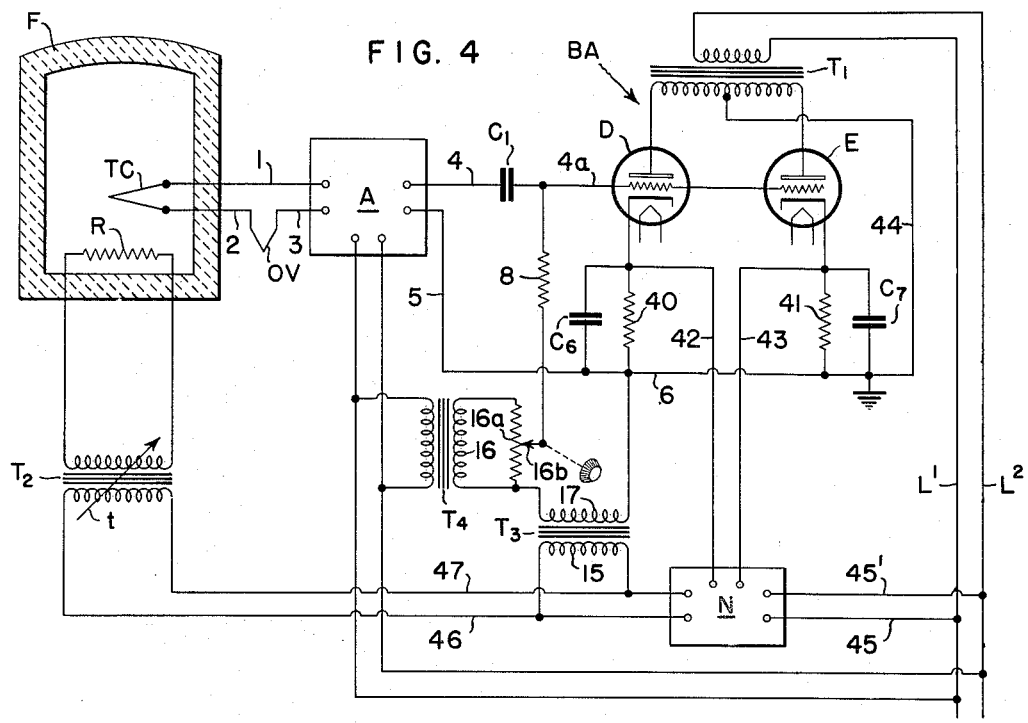
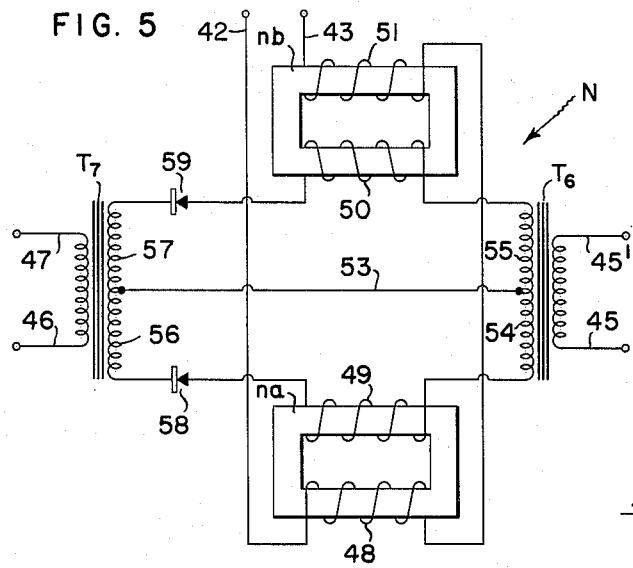
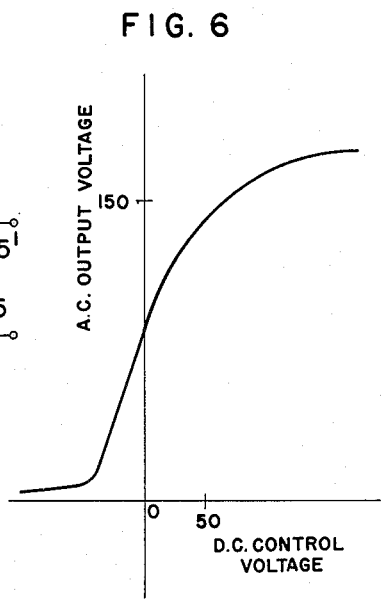
INVENTOR.
JAMES C. MOUZON
BY Arthur H. Swanson
ATTORNEY.

United States Patent Office 2,724,040
Patented Nov. 15, 1955

2,724,040

CONTROL APPARATUS

James C. Mouzon, Chevy Chase, Md., assignor to Minneapolis-Honeywell Regulator Company, Minneapolis, Minn., a corporation of Delaware Application August 17, 1950, Serial No. 179,930

8 Claims. (Cl. 219—20)

A general object of the present invention is to provide novel electrical means for effecting proportional control in response to variations in the value of a variable controlling quantity. The invention was primarily devised and is especially adapted for use in temperature control, but is also capable of use in response to variations in other conditions which produce small changes in electrical voltage or current.

A more specific object of the invention is to provide novel and effective means for opposing an electrical quantity, varying in proportion to a change in a condition to be controlled, against a second electrical qauntity which is a measure of the regulating effect to which the condition is subjected, and to provide means responsive to differences in the values of the opposing electrical quantities for varying the second electrical quantity.

Still more specifically, the object of the invention is to provide temperature control apparatus including a thermocouple responsive to a temperature to be controlled, means for supplying a heating current regulable to vary said temperature, electronic voltage amplifying means having an input circuit including said thermocouple and having an output circuit including the control winding of a device which is operative to regulate said heating current in accordance with changes in the current in said output circuit, and means for varying the output current of said amplifying means in automatic response to variations in the relative values of said heating current and the output voltage of said thermocouple.

In a preferred form of the invention, the means for supplying heating current includes a variable transformer adjustable to vary the ratio of said heating current to said output current and thereby produce a reset action. The adjustment of the variable transformer may be effected manually or automatically, accordingly as manual or automatic reset action is desired.

The input circuit of the amplifier may include a source of voltage, opposing the thermocouple voltage, in the form of a control thermocouple, the cold junction of the thermocouple having its hot junction exposed to the temperature to be regulated, or a potentiometer adjustable to effect control point adjustments.

A practical advantage of the invention is that it may include and make effective use of the voltage amplifying and motor drive apparatus and reversible rebalancing motor of the well known and widely used type disclosed in the Wills Patent 2,423,540 of July 8, 1947. A further practical advantage of the invention is that ordinary variations in the voltage across the supply conductors providing alternating current for energizing the amplifying apparatus, the rebalancing motor, and the heating current regulator are without practical effect on the operation of the apparatus. It is practically feasible, and may be desirable in some cases, to replace the above mentioned rebalancing motor by a saturable core reactor or transformer.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 4 is a circuit network diagram illustrating a modification in which the rebalancing motor shown in Fig. 1 is replaced by a magnetic amplifier;

Fig. 5 is a diagram illustrating the construction of one form of magnetic amplifier suitable for use in the apparatus of Fig. 4; and Fig. 6 is a curve describing the operation of the magnetic amplifier of Figs. 4 and 5.

Figure 1:
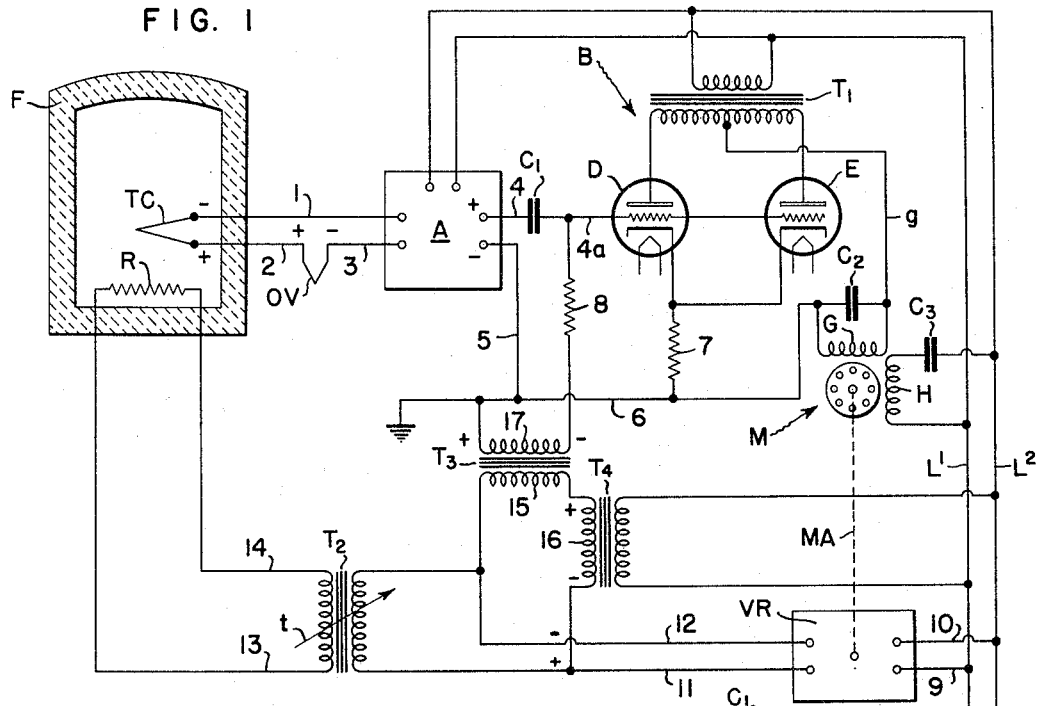
Fig. 1 is a diagram illustrating one embodiment of the invention.

In the desirable form of the invention illustrated in Fig. 1, F designates an electrical heating device or furnace including a heating resistor R and a thermocouple TC having its hot junction exposed to the temperature of the device F. One terminal of the thermocouple TC is connected by a conductor 1 to one input terminal of a voltage amplifier A. The second terminal of the thermocouple TC is connected by a conductor 2 to one terminal of a thermocouple OV which has its second terminal connected by a conductor 3 to the second input terminal of the amplifier A, and which is arranged to impress a voltage on the amplifier input circuit opposing the voltage of the thermocouple TC. The device OV may be an independent thermocouple responsive to an independent controlling temperature, or, in some cases, it may be the cold junction of the thermocouple TC having its hot junction connected between the terminal conductors 1 and 2.

The output signal of the voltage amplifier A controls the operation of a rebalancing motor M through a power amplifying, electronic motor drive unit B comprising valves D and E. The latter are shown as triodes, each having its control grid connected by a conductor 4, a condenser $C_1$, and conductor $4a$ to one output terminal of the amplifier A, and each having its cathode connected to the second output terminal 5 of the amplifier A. As shown, the terminal 5 is connected to a grounding conductor 6, to which the cathodes of the valves D and E are connected through a common cathode resistor 7, and to which the control grids of the valves D and E are connected through a resistor 8 and the secondary winding 17 of a transformer $T_3$. The anodes of the valves D and E are respectively connected to the opposite end terminals of the secondary winding of an energizing transformer $T_1$. The latter has its primary winding connected across alternating current supply conductors L' and L², which may form part of any available alternating current supply system supplying alternating current of suitable voltage and frequency: for example, 115 volts and 60 cycles per second. The rebalancing motor M comprises a control winding G, a power winding H and a rotor which may be of the squirrel-cage type. The control winding G has one terminal $g$ connected to the midpoint of the secondary winding of the transformer $T_1$, and has its other terminal connected to the cathodes of the valves D and E, through the resistor 7. The power winding H of the motor M is connected across the supply conductors L' and L². The amplifier A has energizing terminals connected to the supply conductors L' and L². Condensers $C_2$ and $C_3$ are respectively connected in shunt to the control winding G and in series with the power winding H. The rebalancing motor M and its energizing and control means may be of the type disclosed in said Wills patent.

Figure 3:
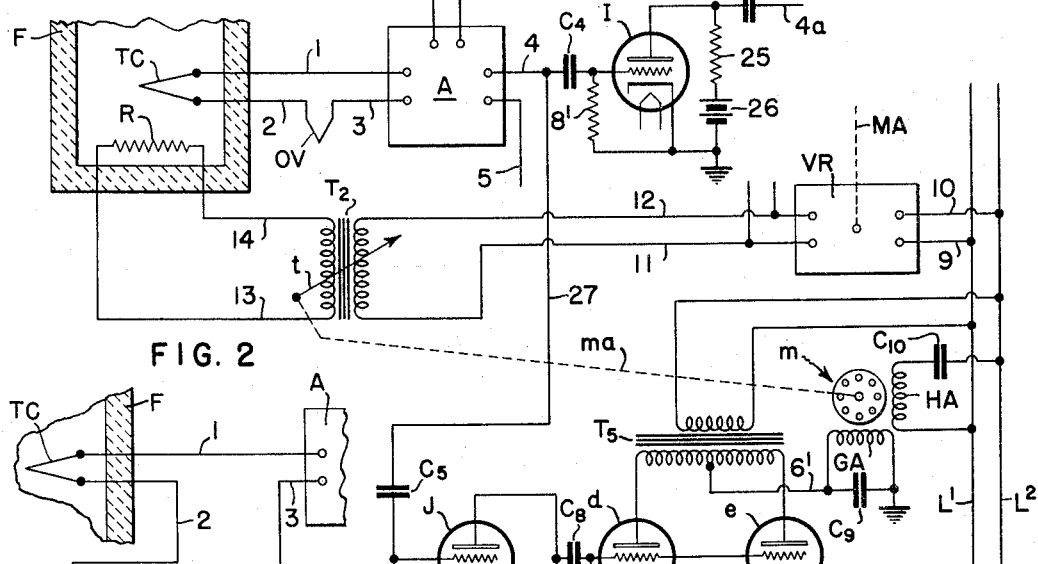
Fig. 3 is a diagram illustrating the addition to the apparatus shown in Fig. 1 of automatic reset provisions.

As shown, the heating resistor R is supplied with energizing or heating current by the supply conductors L' and L² through a voltage regulator VR. The latter has its input terminal conductors 9 and 10 connected to the supply conductors L' and L², respectively, and has the output voltage between its output conductors 11 and 12 adjusted by the rebalancing motor M through a mechanical connection MA. The voltage regulator VR may well be a variable autotransformer or a so-called Variac. As shown, the output terminals 11 and 12 of the voltage regulator VR are operatively connected to the heating resistor R through the primary and secondary windings of a variable transformer T₂, the primary winding of the latter being connected across the conductors 11 and 12, and the heating resistor R being connected across the terminal conductors 13 and 14 of secondary winding of the transformer T₂. The latter also includes an element t adjustable to vary the ratio of the transformer input and output currents, and thus forms a device which may be used to effect a reset action as required to make the regulated temperature of the device F substantially independent of the heating load. The transformer T₂ may be adjusted manually or by automatic adjusting means, one form of which is shown in Fig. 3.

In accordance with the present invention, means are provided for automatically varying the control signal impressed on the input circuit of the motor drive valves D and E as required to maintain a desired relation between the magnitude of the current flowing through the heating resistor R and the hot junction temperature of the thermocouple TC. The signal varying means shown comprises the primary winding 15 of the feedback transformer T₃, and the secondary winding 16 of a transformer T₄, these windings being connected in series with one another across the output conductors 11 and 12 of the voltage regulator VR. The primary winding of the transformer T₄ is connected across the supply conductors L' and L². The secondary winding 17 of the transformer T₃ is connected in the output circuit of the amplifier A in series with the resistor 8 between the conductor 5 and the control grids of the valves D and E. With this arrangement, when the voltage between the regulator output conductors 11 and 12 is equal and opposite to the voltage across the transformer secondary winding 16, zero voltage is impressed by the transformer secondary winding 17 on the input circuit of the motor drive valves D and E. Upon adjustment of the regulator VR, the voltage between the output conductors 11 and 12 becomes different from that developed in winding 16, and, consequently, a voltage of one phase or the other is applied by winding 17 to the input circuit of the valves D and E, depending upon the direction of adjustment of the regulator. The voltage so impressed on the input circuit of valves D and E is arranged to be in opposition to the output voltage signal of the amplifier A.

In the balanced condition of the apparatus shown in Fig. 1, the temperature of the heating device F is such that the voltage of the thermocouple TC is equal and opposite to the voltage of the voltage source OV, and the amplifier A then applies no output signal to the control grids of the valves D and E. Under this condition, the apparatus is so arranged that the voltages between the conductors 11 and 12 and across the winding 16 are just equal and opposite to one another, whereby no feedback voltage appears across the transformer secondary winding 17, with the result that the motor M is not operatively energized. When, as a result of a change in operating conditions, the temperature of the thermocouple TC increases or decreases, and the value of the thermocouple voltage is thereby made unequal to the opposing voltage of the source OV, a control signal will be impressed by the amplifier A on the control grids of the valves D and E. Thereupon, the motor M will be set into operation to increase or decrease the output voltage of the voltage regulator VR as required to restore the furnace temperature to the normal value by increasing or decreasing the heating current supplied to the heating resistor R.

In the apparatus shown in Fig. 1, the transformers T₃ and T₄ cooperate continuously to impress on the input circuit of the amplifier unit B a feedback voltage signal in each rebalancing operation. The purpose of that feedback signal is to make the extent of the adjustment of the motor M and thereby the extent of the adjustment of the regulator VR proportional to the deviation in the furnace temperature from its normal, desired value.

The feedback voltage signal impressed on the input circuits of the valves D and E by the transformers T₃ and T₄ must have its phase so related to the phase of the signal voltage developed in the output circuit of the amplifier A as to diminish the effect of the latter on the input circuit of the valves D and E. This requires that the windings of the transformers T₃ and T₄ should be so connected relative to one another and to the supply conductors L' and L² that the instantaneous voltages impressed on the conductor 4 by the amplifier A and on the conductor 4a by the transformer T₃ will have the relative instantaneous polarities indicated by the plus and minus symbols applied in Fig. 1.

Each rebalancing operation is initiated as a result of the failure of the resistor R to supply heat to the device F at the rate required to maintain the voltage of the thermocouple TC equal in magnitude to the opposing voltage of the device OV, and the voltage across the regulator output conductors 11 and 12 will be different at the end of each rebalancing operation from what it was at the beginning of the rebalancing operation. In consequence, the apparatus shown in Fig. 1 operates automatically to tend to maintain the heater F at approximately the temperature at which the output voltage of the thermocouple TC is equal in magnitude to the opposing voltage of the device OV.

The general operation of the apparatus described above would occur if the variable transformer T₂ were omitted. In such case, however, the regulation obtained would be regulation with a "drooping characteristic," which, as is well known, is a type of regulation in which the furnace temperature attained at balance increases and decreases in a predetermined manner as the furnace heating demand respectively decreases and increases. In order to eliminate such "drooping characteristic" operation, the variable transformer T₂ is provided to permit variation in the relation between the adjusted position of the regulator VR and the energizing current flow through the furnace heating resistor R. Thus, the energizing current flow to the heating resistor R may be varied by adjustment of the adjusting element t of the transformer T₂ as required to restore the furnace temperature to the desired normal value.

Figure 2:
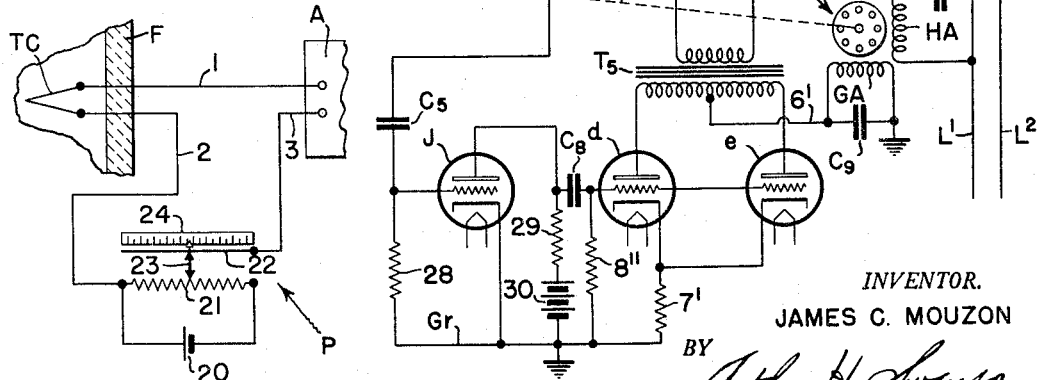
Fig. 2 is a diagram illustrating a modification of the input circuit of the voltage amplifier of Fig. 1.

In Fig. 2, I have illustrated, by way of example, a modification of the apparatus shown in Fig. 1 in which the voltage source OV is replaced by an adjustable control point device P. The latter includes a potentiometric resistor 21 connected across a battery or other source of unidirectional voltage 20. One terminal of the source 20 is connected to the conductor 2. The conductor 3 is connected to an elongated stationary contact 22 located alongside and parallel to the resistor 21. The contact 22 provides a means through which the conductor 3 is connected to a slider contact 23 which is adjustable along the length of the resistor 21. There is also provided a scale 24 to indicate the position of the contact 23 along the resistor 21.

In operation, the balanced condition of the apparatus shown in Fig. 2 is obtained when the current flowing through the heating resistor R is that required to maintain the voltage of the thermocouple TC equal in magnitude and opposite in direction to the voltage drop in the portion of the resistor 21 then connected between the conductors 2 and 3. As those skilled in the art will recognize, the adjustment of the slider contact 23 along the resistor 21 is a control point adjustment, and the control point temperature is indicated by the position of the slider contact 23 along the scale 24. Suitable adjustment of the transformer $T_2$ will permit the attainment of apparatus balance with no net input voltage to the amplifier A for the desired control point setting.

In Fig. 3, I have illustrated a modification of the apparatus shown in Fig. 1 which includes automatic means for adjusting the element $t$ of the transformer $T_2$ as required to obtain an automatic reset action. In the form of the present invention shown in Fig. 1, the regulating element $t$ of the transformer $T_2$ is manually adjustable, and may be used to effect manual reset action. As is well known, reset action is employed to substantially eliminate the inherent tendency of stable furnace temperature controlling apparatus, providing regulation with a drooping characteristic, to maintain a normal furnace temperature which increases and decreases as the furnace heat output demand decreases and increases. In Fig. 3, a condenser $C_4$ and an electronic valve I, shown as a triode, are interposed between the output terminal 4 of the amplifier A and the condenser $C_1$. As shown, the condenser $C_4$ directly connects the output terminal 4 to the control grid of the valve I. The anode of the valve I is connected directly to the adjacent terminal of the condenser $C_1$. The second terminal of the condenser $C_1$ may be connected to the control grids of the valves D and E as in Fig. 1. The cathode of the valve I is connected to ground. The anode of the valve I is connected to ground through a resistor 25 and a suitable anode voltage source shown as a battery 26. A grid resistor 8' is connected between the control grid of the valve I and ground.

The output conductor 4 of the amplifier A is connected through a conductor 27 and a condenser $C_5$ to the control grid of an amplifier valve J, shown as a triode. The control grid of the valve J is connected to a grounded conductor Gr by a grid resistor 28, and the anode of the valve J is connected to the grounded cathode of that valve through a resistor 29 and a suitable anode voltage source, shown as a battery 30. The anode of the valve J is coupled by a condenser $C_8$ to the control grids of triode valves $d$ and $e$ which control the energization of a reset motor $m$, as the rebalancing motor M is controlled by the valves D and E of Fig. 1. The rotor of the motor $m$ is connected by an element $ma$ to the element $t$ of the transformer $T_2$. Energizing current is supplied to the anodes of the valves $d$ and $e$ through the secondary winding of a transformer $T_5$ having its primary winding connected to the supply conductors L' and $L^2$. A conductor 6' connects one terminal of the control winding GA of the motor $m$, and the condenser $C_9$ in parallel therewith, to the center-tap of the secondary winding of the transformer $T_5$. The remaining terminals of the winding GA and condenser $C_9$ are connected to ground.

The cathodes of the valves $d$ and $e$ are connected together and to the grounded conductor Gr by a cathode bias resistor 7'. A grid resistor 8'' connects the control grids of the valves $d$ and $e$ to the conductor Gr. The power winding HA of the motor $m$ is connected in series with a condenser $C_{10}$ across the supply conductors L' and $L^2$.

With the circuit arrangement shown by way of example in Fig. 3, when the temperature of the thermocouple TC falls below or rises above its normal value, an alternating current signal of one phase or of opposite phase, respectively, is transmitted through the conductors 4 and 27 and the condenser $C_5$ to the control grid of the valve J. The signal thus impressed on the control grid of the valve J and amplified by that valve will cause one or the other of the valves $d$ and $e$, depending on the phase of the signal, to increase in conductivity during the half cycles in which the anode of that valve is positive relative to the cathode of the valve.

When either of the valves $d$ and $e$ is thus made increasingly conductive, the motor $m$ rotates in the direction to produce a corresponding adjustment of the regulating element $t$ of the transformer $T_2$. If it is assumed, for example, that the signal transmitted to the valve J from the amplifier A, when the temperature of the hot junction of the thermocouple TC is low, causes the valve $d$ to set the motor $m$ into rotation, the direction of motor rotation will be that required to adjust transformer element $t$ in the direction to increase the current flowing to the heating resistor R through the conductors 13 and 14 for a given setting of the regulator VR. Conversely, when the amplifier output signal results from a rise in the temperature of the hot junction of the thermocouple TC above its normal value, the valve $e$ will then be rendered more conductive during the half cycles in which the anode of the valve is positive relative to the valve cathode, and the motor $m$ will then turn in the direction to decrease the heating current passing through the conductors 13 and 14 to the heating resistor for a given setting of the regulator VR.

When a departure of the thermocouple temperature from its normal value in either direction causes the motor $m$ to be started into operation, the latter adjusts the variable transformer $T_2$ in the appropriate direction to effect the return of the thermocouple voltage to its normal value. When the motor $m$ is started into operation in either direction, it continues to thus operate in that direction until the control voltage is restored to its normal value, unless the maximum possible adjustment of the transformer $T_2$ will not render the latter operative to supply a current large enough or small enough to return the thermocouple temperature to its normal value. This automatic reset action is performed, of course, in conjunction with the control adjustments given to the regulator VR by the motor M.

Because of the isolation of the input to the valve J from the feedback signal from the transformer $T_3$, which isolation is afforded by the valve I, the reset motor $m$ operates solely in accordance with departures of the temperature of the thermocouple TC from the desired value, and is not directly affected by the feedback signal which controls the operation of the motor M.

In Figs. 4 to 6, I have diagrammatically illustrated the construction and operation of apparatus for obtaining the general operating results obtainable with the apparatus shown in Fig. 1 by mechanism in which the rebalancing motor M and regulator VR of Fig. 1 are replaced by a saturable transformer or magnetic amplifier N. The apparatus shown in Fig. 4 comprises a control unit BA which is controlled in the same manner as is the unit B of Fig. 1. The unit BA, as shown, differs from the unit B of Fig. 1 only in respect to the connections made to the cathodes of the valves D and E. In Fig. 4, the cathodes of the valves D and E are connected to the grounding conductor 6 by separate resistors 40 and 41, respectively, and by condensers $C_6$ and $C_7$ connected in parallel with the resistors 40 and 41, respectively. The cathodes of the valves D and E of Fig. 4 are also connected to the input terminals 42 and 43, respectively, of the magnetic amplifier N. In Fig. 4, a conductor 44 replaces the center tap connection $g$ of Fig. 1 and connects the midpoint of the secondary winding of the transformer $T_1$ to ground.

The magnetic amplifier N has, in addition to its direct current input control terminals 42 and 43, a pair of alternating current energizing input terminals 45 and 45', and a pair of alternating current output terminals 46 and 47. The energizing terminals 45 and 45' are connected to the alternating current supply conductors L' and $L^2$, respectively, and the alternating current output terminals 46 and 47 are connected through the variable transformer T2 to the opposite ends of the heating resistor R in the heater or furnace F. The apparatus shown in Fig. 4 includes means similar in operative principle to, but differing in form from, those shown in Fig. 1 for impressing a feedback signal on the input circuit of the unit BA. Thus, as shown in Fig. 4, the resistor 8 is connected to grounding conductor 6 through the secondary winding 17 of the transformer T3 and through a variable portion of a slidewire resistor 16a connected across the secondary winding 16 of the transformer T4. The resistor 8 is connected to the resistor 16a by a slider contact 16b. The latter may be manually adjusted along the resistor to thereby adjust the control point temperature which the Fig. 4 apparatus tends to maintain. The feedback signal transmitted by the resistor 8 to the control grids of the valves D and E varies in response to a change in the rate of heat supply to the resistor R in Fig. 4 as in Fig. 1.

As in the Fig. 1 arrangement, the primary winding of the transformer T4 of Fig. 4 is connected across the supply conductors L' and L². In Fig. 4, the primary winding 15 of the transformer T3 is connected directly across the output terminals or conductors 46 and 47.

The magnetic amplifier N, as shown in Fig. 5, comprises two closed magnetic cores $na$ and $nb$. Windings 48 and 49 surround the core $na$, and windings 50 and 51 surround the core $nb$. The windings 48 and 51 are connected in series between the control terminals 42 and 43. The windings 49 and 50 are connected in a circuit network included in the magnetic amplifier N and comprising an input transformer T6 and an output transformer T7. The input transformer T6 comprises a primary winding connected between the input terminals 45 and 45', and a secondary winding having equal sections 54 and 55, each section having one end adjacent and connected to one end of the other. The joined ends of the winding sections 54 and 55 are connected to a conductor 53. The second end of the conductor 53 is connected to the adjacent connected ends of the two primary winding sections 56 and 57 of the transformer T7. The transformer T7 includes a secondary winding connected between the output terminals 46 and 47 of the device N. The windings 54 and 56 are connected in series with the winding 49 and a rectifier 58 in a closed circuit including the conductor 53. Similarly, the winding 50 is connected in series with the windings 55 and 57 and a rectifier 59 in a closed circuit including the conductor 53. The transformer windings 54, 55, 56, and 57 and the rectifiers 58 and 59 are so relatively arranged that the two rectifiers pass unidirectional current pulses through the conductor 53 in the same direction, each during half cycles alternating with the half cycles in which the other rectifier passes pulses of current through said conductor.

When the apparatus shown in Fig. 4 is in its balanced condition, the valves D and E are equally conductive and the currents flowing through the valves D and E and the resistors 40 and 41 cause the control terminals 42 and 43 of the magnetic amplifier to be maintained at substantially the same potential. In consequence, there is then no significant current flow through the windings 48 and 51. The windings 49 and 50 are so proportioned and arranged that under this condition the pulsating currents flowing through the windings 56 and 57 are equal in magnitude, and the impedances of the windings 49 and 50 are then not modified by the presence of the windings 48 and 51. In consequence, the current then caused to flow through the heating resistor R from the transformer T7 is independent of, and unaffected by, the existence of the valves D and E and their connections to the device N. The amount of current then supplied to the heating resistor R depends upon the design or calibration of the apparatus, though it may be made subject to adjustment in various ways, as for example, by means of the variable transformer T2. The windings 48 and 51 are so proportioned and arranged and so proportioned relative to the windings 49 and 50 that when currents of similar magnitude flow through the coils 49 and 50, as is ordinarily desirable at all times, the voltages induced in the windings 48 and 51 by those currents are similar in magnitude but opposed in phase to one another and hence have no significant effect on the operation of the apparatus.

When a change in the heat output of the furnace F results in a decrease in the temperature of the furnace F, the thermocouple TC and amplifier A cause an alternating signal to be impressed on the control grids of the valves D and E of a predetermined phase. The latter may be assumed to be that required to increase the conductivity of the valve D during the half cycles in which the anode of that valve is positive relative to the cathode of the valve. In consequence, a current is then caused to flow from the cathode of the valve D to ground through the circuit including the terminal 42, windings 48 and 51, terminal 43, and resistor 41. That current is substantially free from A. C. ripple components, due to the action of the condensers C6 and C7. For the purposes of the present invention, the windings 48 and 51 are so arranged relative to the windings 49 and 50, respectively, that the effect of the current flow through the windings 48 and 49 in the direction assumed operates to increase the magnitude of the current flowing in the secondary winding of the transformer T7 by suitably varying the impedances of the windings 49 and 50. Thus, the supply of heat to the furnace F is increased in predetermined accordance with the increase in the demand for heat.

Conversely, when the control apparatus is unbalanced as a result of a decrease in the demand for heat and a resultant increase in the temperature of the furnace F and the thermocouple TC, the control signal then transmitted to the control grids of the valves D and E increases the conductivity of the valve E and thereby produces a current flow from the cathode of the valve E to ground through the terminal 43, windings 51 and 48, terminal 42, and resistor 40. For the direction of current flow through the windings 51 and 48 then existing, the amplifier N operates to produce a corresponding reduction in the magnitude of the current supplied to the heating resistor R by the secondary winding of the transformer T7. Since the above described operation of the amplifier N is that well known in the art in connection with conventional magnetic amplifiers of the type disclosed in Fig. 5, no further explanation of the operation of the amplifier N is thought to be necessary herein.

The curve of Fig. 6 illustrates the typical operation of a magnetic amplifier of the type shown in Fig. 5. As will be apparent from the Fig. 6 curve, as well as from the description of the operation hereinbefore given, the amplifier N will have a predetermined, fixed A. C. output voltage when the D. C. control voltage from the valves D and E is equal to zero. For a control voltage of one polarity, producing a current flow in one direction between the control terminals 42 and 43, the amplifier output voltage will be decreased below said predetermined value by an amount which is a function of the magnitude of the control voltage. Similarly, a control voltage of the opposite polarity will produce current flow between the terminals 42 and 43 in the opposite direction, and this will result in an increase in the amplifier output voltage above said predetermined value. The magnitude of this increase will be a function of the magnitude of the control voltage.

The apparatus collectively illustrated by Figs. 4 and 5 is adapted to operate like the apparatus shown in Fig. 1 in that its regulation of the heat supply to the furnace F is of the "drooping characteristic" type, and also in that the regulation is stabilized by the feedback signal transmitted through the resistor 8 from the means supplying current to the heating resistor R. The apparatus shown in Figs. 4 and 5 may include manual reset provisions analogous to those disclosed in Fig. 1, or may include automatic reset mechanism analogous to that illustrated in Fig. 3.

The regulation of the heat input to the heating resistor R effected through the magnetic amplifier N of Figs. 4 and 5 is analogous to that effected in Fig. 1 by the regulator VR and its adjusting motor M.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Automatic control apparatus comprising, in combination, a pair of load terminals adapted for connection to a current responsive load element, a regulator having input terminals arranged for connection to a source of alternating current and having output terminals connected to said load terminals and supplying current thereto, a device adapted to respond to an effect produced by said load element, electronic amplifying means through which, on a change in said effect, said device adjusts said regulator in a direction tending to reduce said change, and a feedback connection to said amplifying means from the output terminals of said regulator arranged to impress a degenerative feedback signal on the input circuit of said amplifying means.

2. Automatic control apparatus as specified in claim 1, in which said regulator is an adjustable transformer.

3. Automatic control apparatus as specified in claim 1, in which said regulator is a magnetic amplifier comprising adjustable impedance circuit elements connected between said input and output terminals and means actuated by said electronic amplifying means and operative to increase or decrease the impedances of said circuit elements as said effect varies in one direction or in the opposite direction.

4. Automatic control apparatus as specified in claim 1, in which the connections between said regulator output terminals and said load terminals include a transformer having input terminals connected to the output terminals of said regulator and having output terminals to which said load terminals are connected, and reset means adjustable to vary the ratio between the transformer input and output currents.

5. Automatic control apparatus as specified in claim 4, including electronic means actuated by said device on a change in said effect and operative to adjust continuously said reset means in a direction dependent on the direction of change in said effect until the latter returns to its normal value.

6. Automatic control apparatus comprising, in combination, a heating resistor, a device responsive to a heating effect produced by said resistor, electronic amplifying means including an output circuit through which said device causes a unidirectional current to flow in one direction or in the opposite direction on a respective change in said heating effect in one direction or in the opposite direction from a normal value, and means for supplying an alternating heating current to said resistor and including a magnetic amplifier actuated by said unidirectional current and operative to increase or decrease said heating effect accordingly as said unidirectional current in one direction or in the opposite direction.

7. Automatic control apparatus as specified in claim 6, in which said magnetic amplifier comprises an input winding and an output winding, a first impedance winding connected between one end of said input winding and one end of said output winding, a second impedance winding connected between the second ends of said input and output windings, third and fourth impedance windings arranged in inductive relation with said first and second impedance windings, respectively, and connected in series in the output circuit of said electronic amplifying means and operative to increase or decrease the impedances of said first and second impedance windings accordingly as said unidirectional current flow in said output circuit is in one direction or in the opposite direction, and a conductor connecting the midpoints of said input and output windings, said input winding forming the secondary winding of a transformer having the terminals of its primary winding arranged for connection to a source of alternating current, and said output winding forming the primary winding of a transformer having the terminals of its secondary winding connected to said heating resistor.

8. In measuring and control apparatus of the known type comprising, in combination, means operative on a change in a control condition to create an alternating current signal voltage of predetermined frequency and of one phase or of the opposite phase depending on the direction of said change, an electronic amplifier for amplifying said alternating current signal, and an actuator controlled by said amplifier and actuated on a change in said condition in one direction or the other, depending on the phase of said signal, the improvement comprising a voltage regulator having input terminals adapted for connection to a source of alternating current and having output terminals adapted for connection to a condition adjusting device, means actuated by said actuator to adjust said voltage regulator in accordance with the direction of said condition change, and means for impressing a feedback signal on said amplifier comprising means responsive to variations in the output voltage of said regulator.

References Cited in the file of this patent

UNITED STATES PATENTS

| Number | Name | Date |
|---|---|---|
| 1,582,702 | Stoekle et al. | Apr. 27, 1926 |
| 1,955,322 | Brown | Apr. 17, 1934 |
| 1,991,248 | Hartigan | Feb. 12, 1935 |
| 2,086,120 | Croden | July 6, 1937 |
| 2,218,502 | Breitenstein | Oct. 22, 1940 |
| 2,250,207 | Schneider | July 22, 1941 |
| 2,266,569 | Schneider et al. | Dec. 16, 1941 |
| 2,423,540 | Wills | July 8, 1947 |
| 2,429,827 | Lamm | Oct. 28, 1947 |
| 2,496,860 | Davis | Feb. 7, 1950 |
| 2,528,626 | Wannamaker, Jr., et. al. | Nov. 7, 1950 |
| 2,554,717 | Mouzon | May 29, 1951 |